US012637096B2

(12) United States Patent
Su et al.

(10) Patent No.:     US 12,637,096 B2
(45) Date of Patent:        May 26, 2026

(54) VEHICLE SHIFTING MECHANISM

(71) Applicants: Kuo-Hsin Su, New Taipei City (TW);
Ta-Yu Su, New Taipei City (TW);
Hsun-I Lee, New Taipei City (TW)

(72) Inventors: Kuo-Hsin Su, New Taipei City (TW);
Ta-Yu Su, New Taipei City (TW);
Hsun-I Lee, New Taipei City (TW)

( * ) Notice: Subject to any disclaimer, the term of this
patent is extended or adjusted under 35
U.S.C. 154(b) by 23 days.

(21) Appl. No.: 18/767,536

(22) Filed: Jul. 9, 2024

(65) Prior Publication Data

US 2024/0359699 A1     Oct. 31, 2024

Related U.S. Application Data

(63) Continuation-in-part of application No. 17/846,699,
filed on Jun. 22, 2022, now abandoned.

(51) Int. Cl.
| | |
|---|---|
| *B60W 50/08* | (2020.01) |
| *B60W 10/08* | (2006.01) |
| *B60W 10/10* | (2012.01) |
| *B60W 50/10* | (2012.01) |

(52) U.S. Cl.
CPC .......... *B60W 50/085* (2013.01); *B60W 10/08*
(2013.01); *B60W 10/10* (2013.01); *B60W*
*50/10* (2013.01); *B60W 2510/081* (2013.01);
*B60W 2510/1005* (2013.01)

(58) Field of Classification Search
CPC .... B60W 10/08; B60W 10/10; B60W 50/085;
B60W 50/10; B60W 2510/081; B60W
2510/1005; F16H 2059/0221; F16H
2059/0243; F16H 2061/0216; F16H
61/0213; F16H 61/32; F16H 2061/2892;
F16H 59/14; F16H 2059/0234; F16H
2059/366; F16H 59/0217; B60Y 2200/12;
B60Y 2200/91
See application file for complete search history.

(56) References Cited

U.S. PATENT DOCUMENTS

| | | | | |
|---|---|---|---|---|
| 2005/0230209 A1* | 10/2005 | Duignan | ................ | B62K 23/08 192/3.51 |
| 2008/0179122 A1* | 7/2008 | Sugawara | ................ | H02P 3/00 180/65.245 |
| 2013/0073156 A1* | 3/2013 | Takeuchi | ............ | F16H 61/0213 701/56 |
| 2016/0214614 A1* | 7/2016 | Shirasaki | ............... | B60W 10/11 |
| 2018/0037298 A1* | 2/2018 | Su | ........................... | B60L 15/20 |
| 2019/0301600 A1* | 10/2019 | Matsuura | ............ | F16H 61/0403 |

* cited by examiner

*Primary Examiner* — Farhana Pervin
(74) *Attorney, Agent, or Firm* — Rosenberg, Klein & Lee

(57)              ABSTRACT
A vehicle shifting mechanism includes a transmission box,
a gear-shifting driving unit and a gearshift lever. Through
electrical connection between a manual switch and the
gear-shifting driving unit, the operation of controlling the
forward or reverse gear is carried out, so that the gear-
shifting driving unit drives the gearshift lever to produce the
action of pushing down the gear or pushing up the gear.
Through an auto switch located beside the grip of the
vehicle, and in cooperation with a vehicle control unit, when
the auto switch is turned on to be in automatic shift mode,
the vehicle control unit receives the data of the main power
motor or the engine speed and torque load of the vehicle to
activate the gear-shifting driving unit to drive the gearshift
lever to generate a fully automatic downshifting gear or an
upshifting gear and a neutral gear control.

5 Claims, 15 Drawing Sheets

5

51

VEHICLE SHIFTING MECHANISM

BACKGROUND OF THE INVENTION

1. Field of the Invention

The present invention relates to gear shift technology, in particular, refers to a vehicle shifting mechanism so configured that through the set manual switch and auto switch with a gear-shifting driving unit, the gearshift lever can be pressed down to advance or pushed up to reverse the action control and automatic shift mode.

2. Description of the Related Art

As we all know, because the motorcycle has a transmission box, shifting gears can be performed when starting with high power or when climbing hills and other road conditions to meet the required power, which can greatly save energy. When the conventional vehicle 5 needs to change the speed of the vehicle, as shown in the FIG. 13, by stepping on or reversing the gearshift lever 51, the gears can be changed to achieve the purpose of shifting. But when you need to switch back to the previous gear, you need to hook the gearshift lever 51 up with the instep to achieve the purpose of returning to the previous gear. But when the driver wears high-grade and expensive shoes, when the instep hooks the gearshift lever 51, the surface of the shoe will be scratched and damaged by the gearshift lever 51. If you usually wear thick shoes or rain boots, shoe covers, etc. in rainy days, it will also affect the normal operation when the gearshift lever 51 is hooked up to return to the previous gear.

In addition, in a general motorcycle, because the gearshift lever 51 needs to be used to shift the gears into and out of gear, there are still many people who are unable to drive a motorcycle because they are unfamiliar with shifting gears. In addition, when there are many traffic jams in urban areas, or when going uphill or downhill in the mountains, the driver needs to pay attention to the driving conditions while driving, and also need to constantly change gears depending on the driving needs. In the rush, the complexity and danger of driving operations are caused.

SUMMARY OF THE INVENTION

The present invention has been accomplished under the circumstances in view. It is therefore the main object of the present invention to provide a vehicle shifting mechanism, which comprises a transmission box, a gear-shifting driving unit and a gearshift lever. The gearshift lever is located on the gearshift shaft of the transmission box. The gear-shifting driving unit is arranged on one side of the gearshift lever. Through the electrical connection between a manual switch located beside the grip of the vehicle and the gear-shifting driving unit, the operation of controlling the forward or reverse gear is carried out, so that the gear-shifting driving unit drives the gearshift lever to produce the action of pushing down the gear or pushing up the gear. Through an auto switch located beside the grip of the vehicle, and in cooperation with a vehicle control unit, when the auto switch is turned on to be in automatic shift mode, the vehicle control unit receives the data of the main power motor or the engine speed and torque load of the vehicle to activate the gear-shifting driving unit to drive the gearshift lever to generate a fully automatic downshifting gear or an upshifting gear and a neutral gear control, thereby achieving the purpose of changing gears more conveniently, improving driving safety and saving energy when driving.

Preferably, the gear-shifting driving unit comprises a motor, a speed reducer and a cam. The motor is set at an input end of the speed reducer. The speed reducer comprises a casing, and a first reduction gear and a second reduction gear provided in the casing. The motor is used to drive the first reduction gear. The second reduction gear comprises a power take-off shaft extending out from one side of the casing. A circuit board with a micro-motion sensor is assembled on one side of the casing, and the second reduction gear and the circuit board are enclosed in the casing by a side cover and a gasket. The cam is provided on the power take-off shaft of the second reduction gear. When the motor drives the first reduction gear and the second reduction gear to rotate, the motor also drives the cam to rotate forward or reverse 360 degrees to drive the gearshift lever to produce the action of pressing down the forward gear or pushing up the reverse gear. By means of the magnetic element or a convex part on a hub of the second reduction gear and the micro-motion sensor to generate sensing or pressure contact, and then after the cam rotates forward or reverse 360 degrees, the motor is stopped to make the cam stop at the original position.

Preferably, the gear-shifting driving unit is locked to the transmission box side cover for easy maintenance or replacement of the gear-shifting driving unit.

Preferably, the micro-motion sensor is a sensing chip or a micro switch, and outside the transmission box side cover, there is an outer cover, which is beautiful and anti-fouling.
<Effects Compared to the Prior Art>
The main purpose of the present invention is to control the gear-shifting driving unit to perform forward shifting, backward shifting and automatic shifting operations. With the built-in value of the vehicle control unit, according to the actual load condition of the vehicle, it switches to the most appropriate gear at the best shifting timing in real time, so as to save energy and increase the cruising range of the vehicle. And there is no need to change gears by stepping on or hooking up the gearshift lever, thereby improving the safety of driving.

The second purpose of the present invention is mainly the design of the present invention, in addition to those who are generally familiar with gear shift vehicles, those who could not drive gear shift vehicles can also easily drive gear shift vehicles and experience the fun of gear shift vehicles.

Another purpose of the present invention is to control the gear-shifting driving unit by means of the provided manual switch and the auto switch. In addition to the traditional foot control for shifting, the manual switch provided at the proper position of the grip can be used for manual shifting or switching to automatic shift.

Through the gear-shifting driving unit, the gear shift vehicle can be controlled by foot to change gears or controlled by the manual switch and the auto switch to control the gear-shifting driving unit to perform forward shifting, backward shifting and automatic shifting, thereby improving the driving pleasure and economic value of the gear shift vehicle.

BRIEF DESCRIPTION OF THE DRAWINGS

FIG. 4 to FIG. 4-3 show cam reverse rotation 360 degrees to complete the continuous action of pressing the gearshift lever once.

FIG. 5 to FIG. 5-3 show cam forward rotation 360 degrees to complete the continuous action of pushing up the gearshift lever once.

DETAILED DESCRIPTION OF THE PREFERRED EMBODIMENTS

Figure 1:
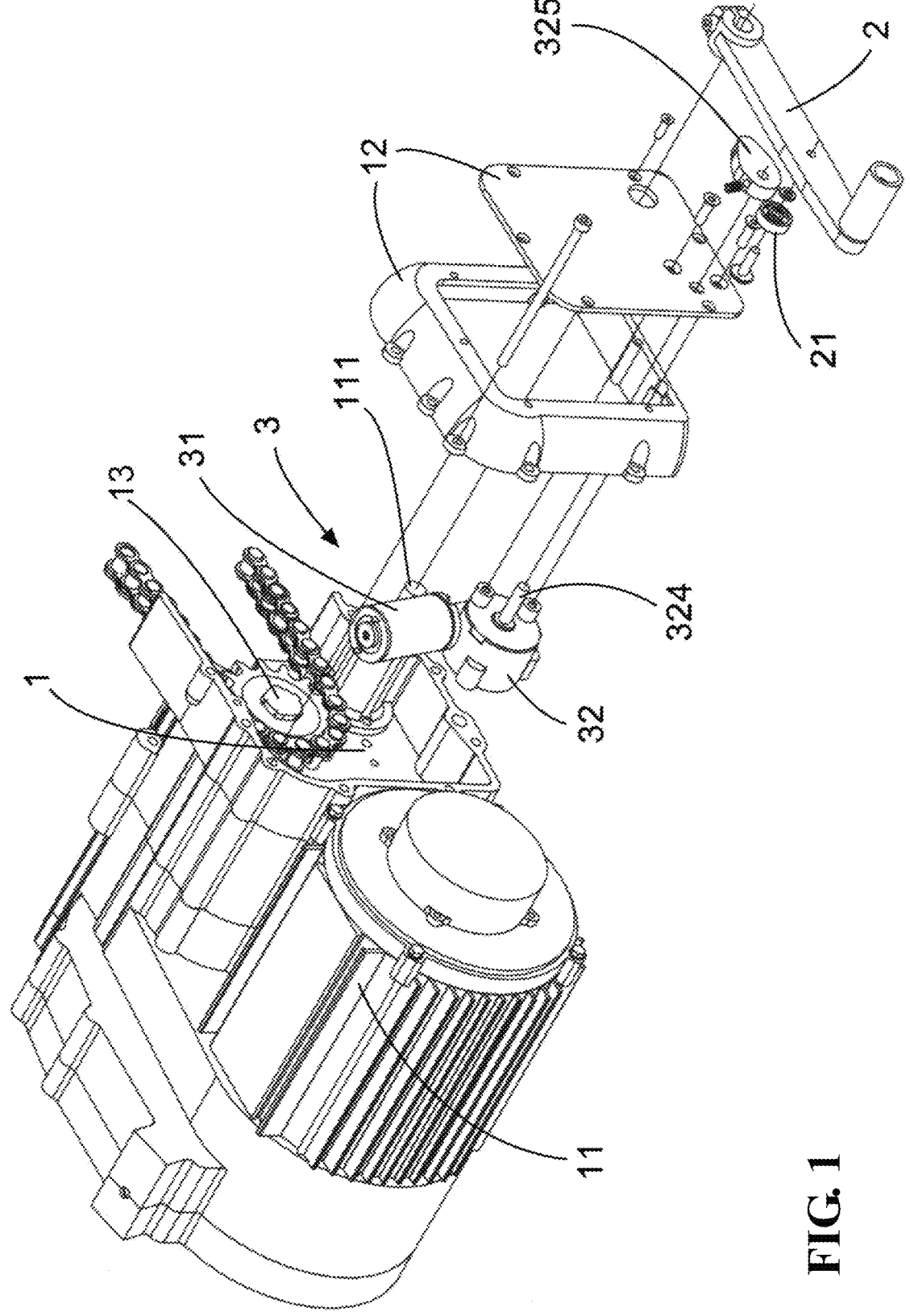
FIG. 1 is an exploded perspective view of a preferred embodiment of the present invention.
Figure 2:
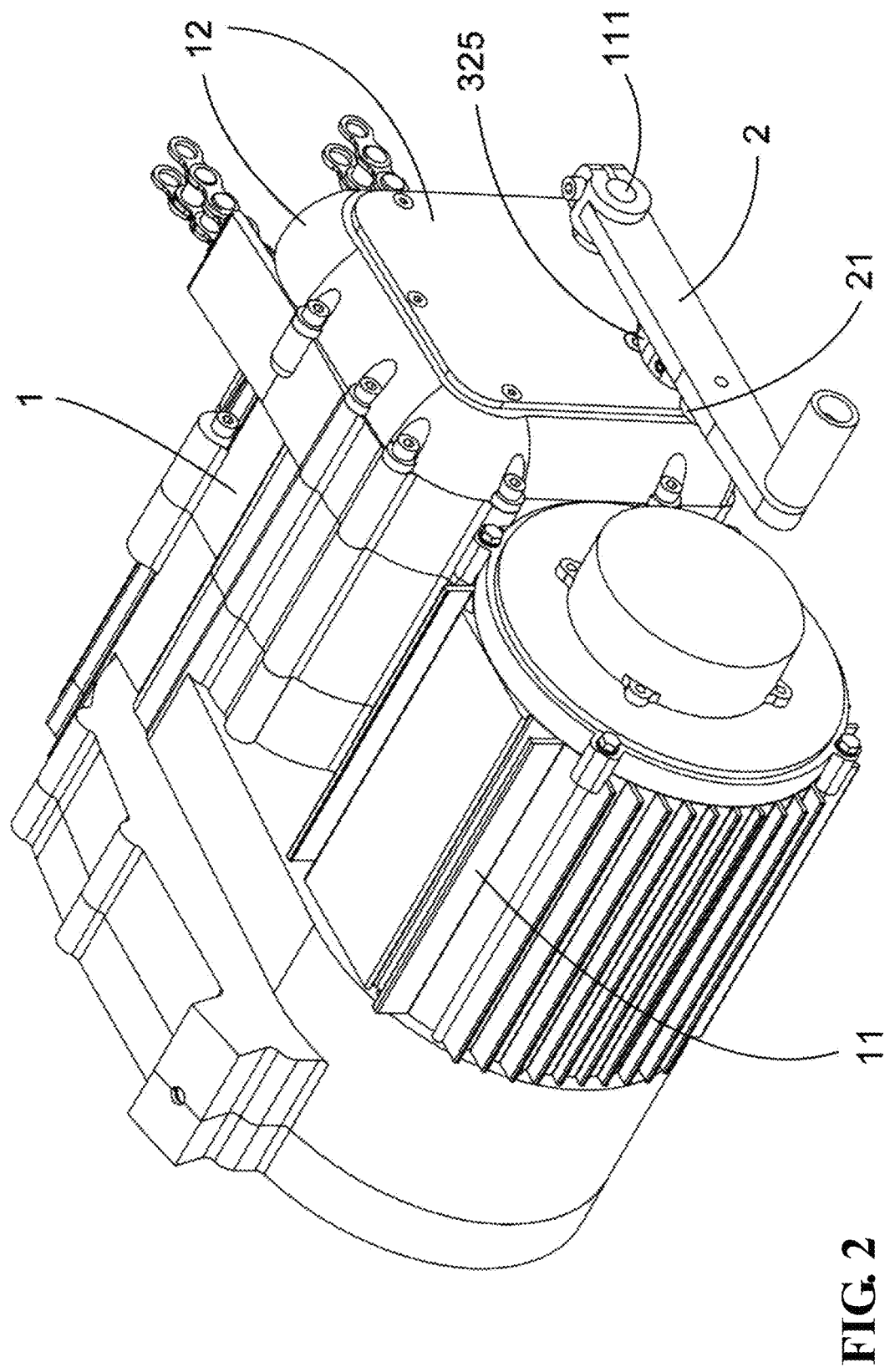
FIG. 2 is a combined perspective view of the structure shown in FIG. 1.
Figure 3:
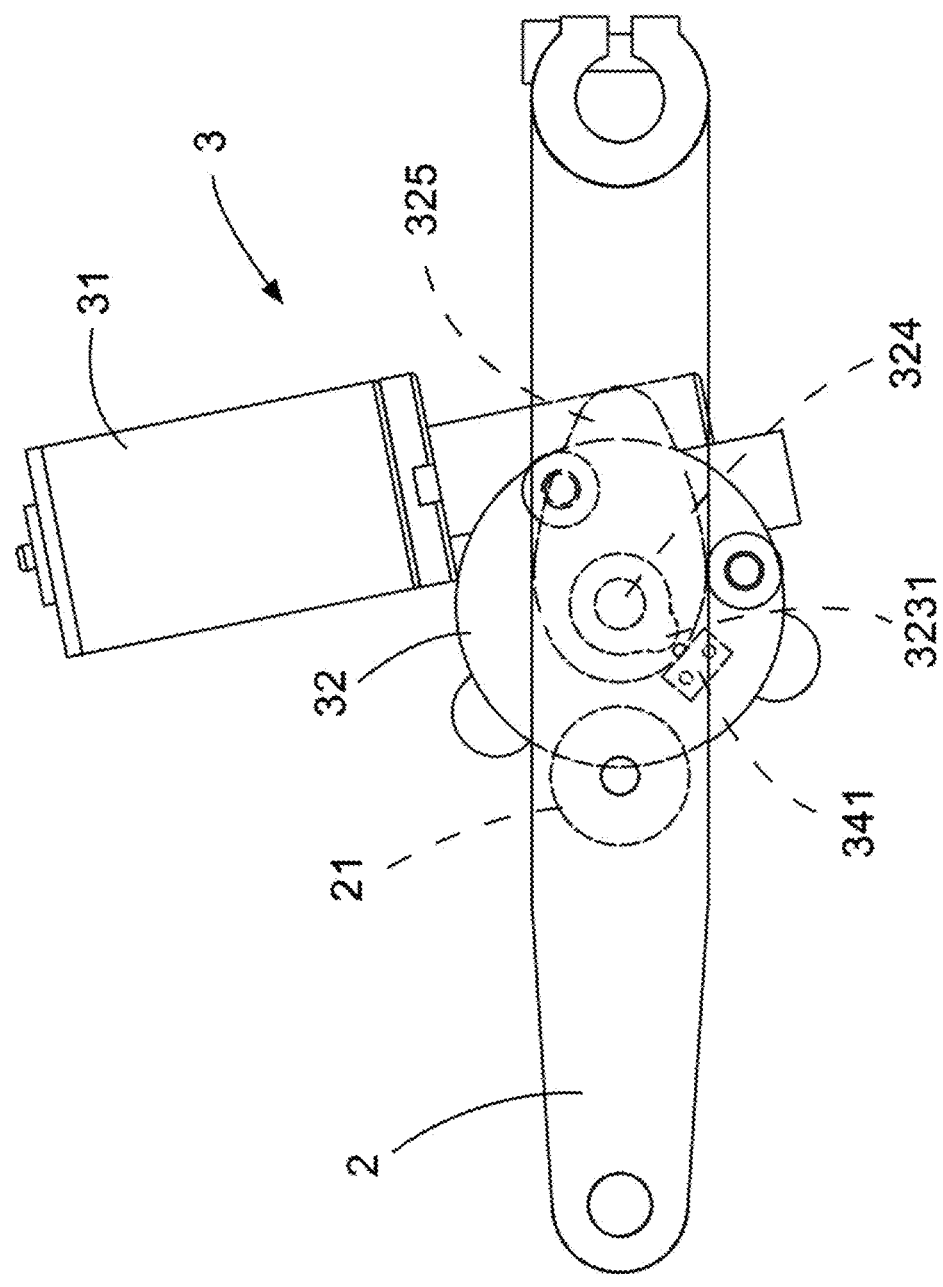
FIG. 3 is a side view of the gear-shifting driving unit and gearshift lever of the present invention.
Figure 6:
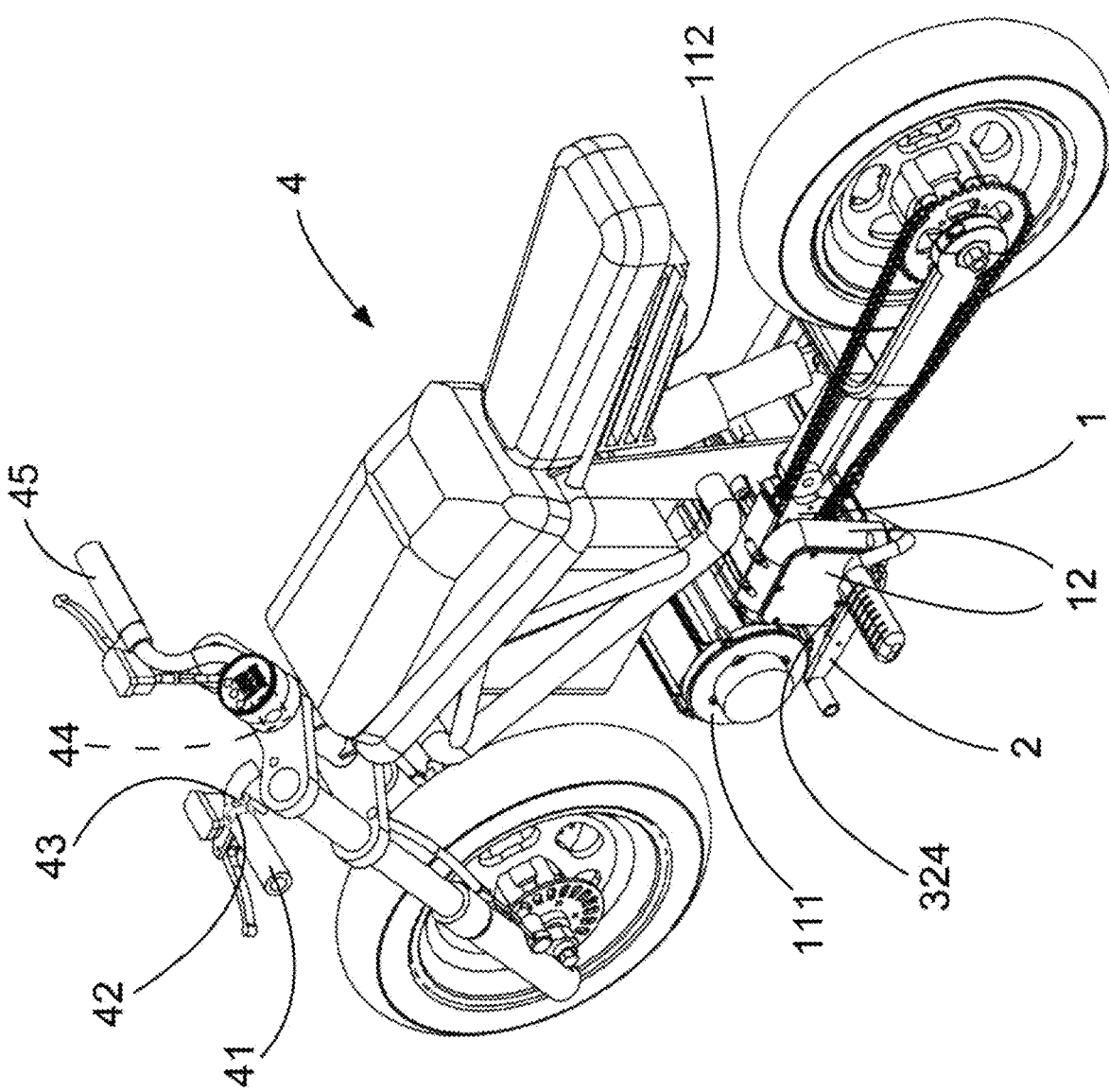
FIG. 6 is a perspective view of an embodiment of the present invention when it is actually used on a vehicle.
Figure 7:
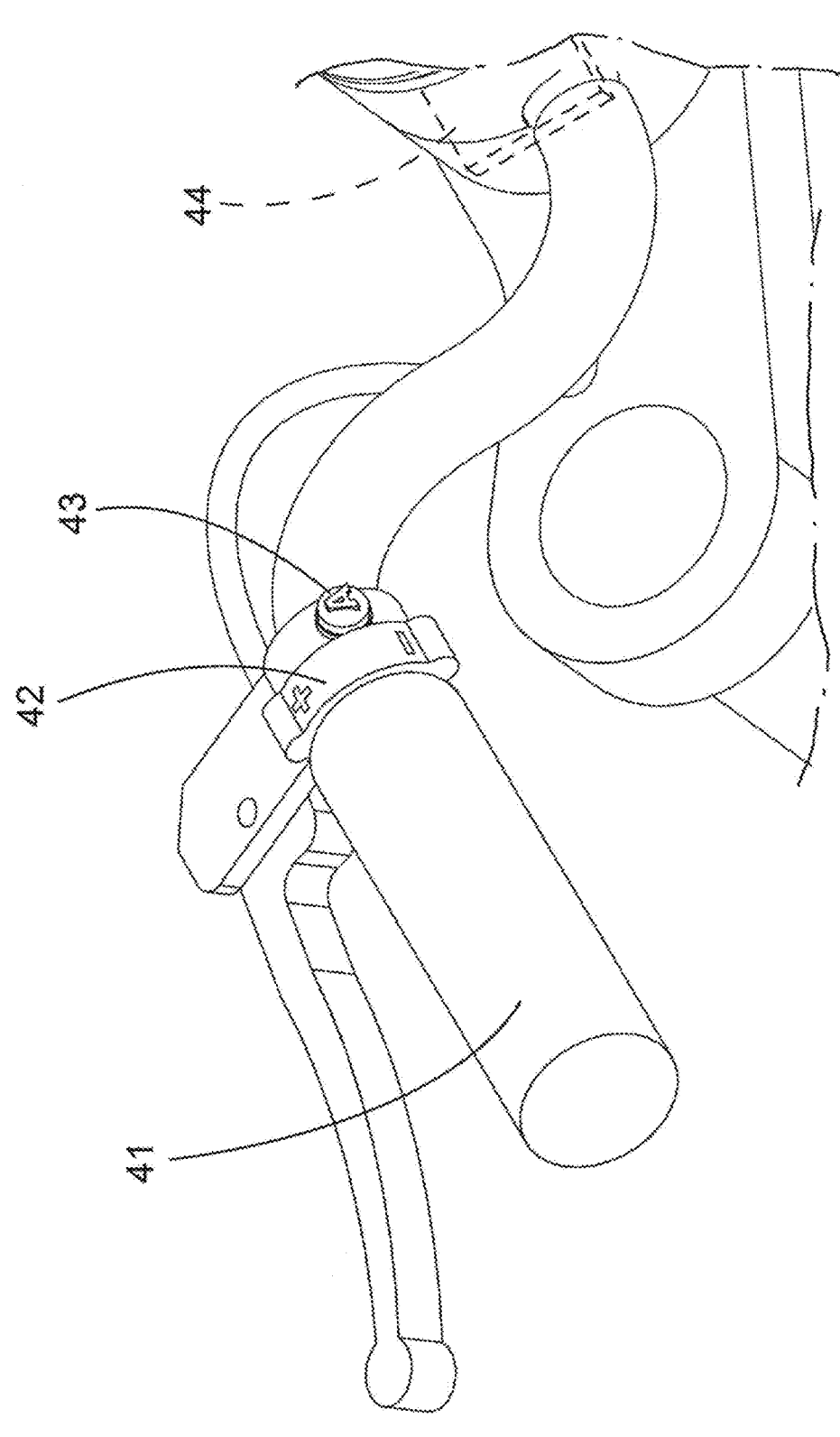
FIG. 7 is an enlarged view of an embodiment of the present invention where the vehicle grip is provided with a manual switch for forward and reverse gears and an auto switch.
Figure 8:
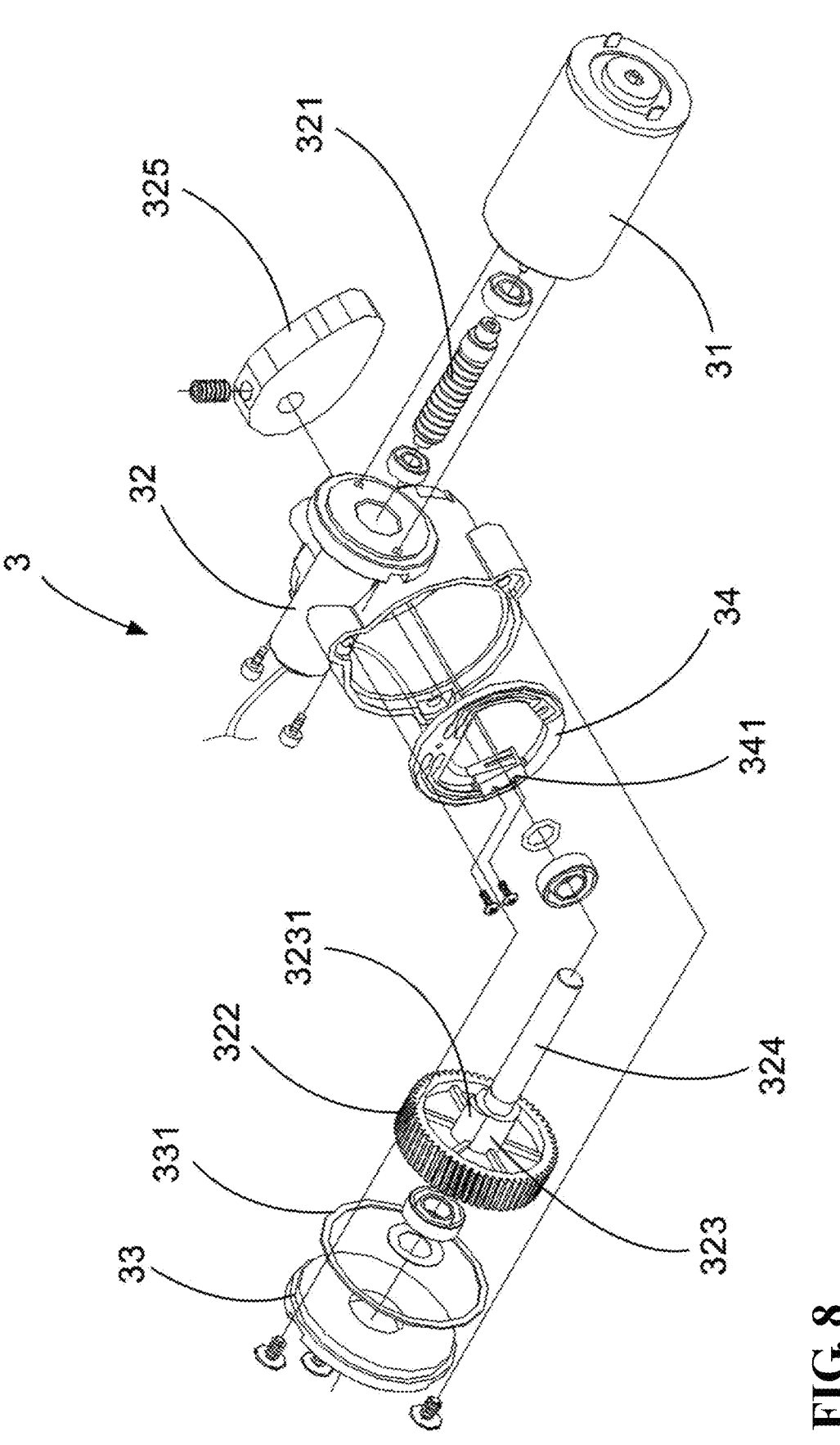
FIG. 8 is an exploded perspective view of the gear-shifting driving unit of the present invention.
Figure 9:
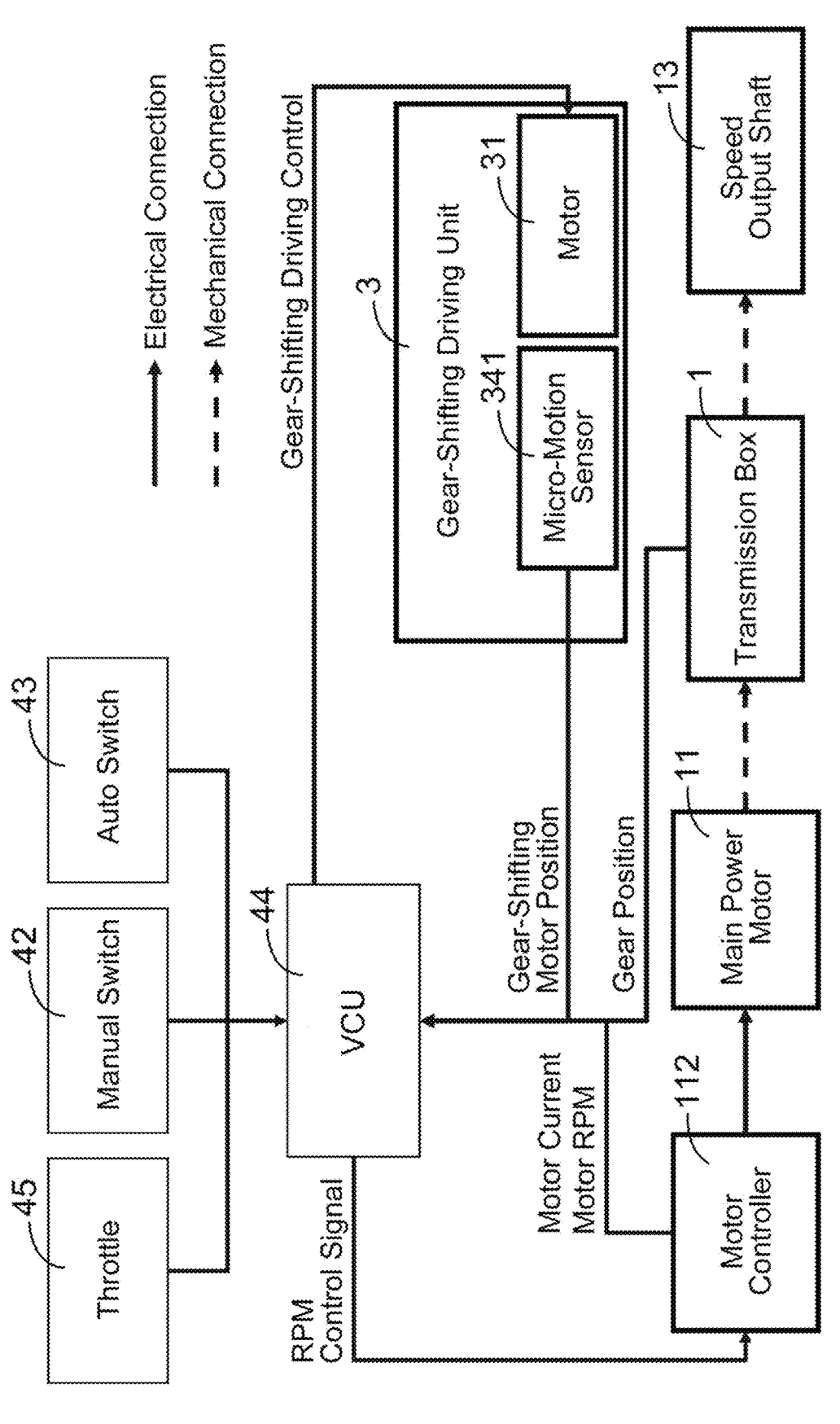
FIG. 9 is a control flow block diagram of the vehicle control unit of the present invention.

Referring to FIGS. 1-3, the present invention provides an improved vehicle shifting mechanism, which comprises a transmission box 1 driven by a main power motor 11, a gearshift lever 2 and a gear-shifting driving unit 3. The gearshift lever 2 is located on the gearshift shaft 111 of the transmission box 1. The gear-shifting driving unit 3 is arranged on one side of described gearshift lever 2. Through the electrical connection between the manual switch 42 located beside the grip 41 of the vehicle 4 and the gear-shifting driving unit 3, the operation of controlling the forward or reverse gear (as shown in FIGS. 6 and 7) is carried out, so that the gear-shifting driving unit 3 drives the gearshift lever 2 to produce the action of pushing down the gear or pushing up the gear. And through an auto switch 43 located beside the grip 41 of the vehicle 4, and in cooperation with a vehicle control unit 44, when the auto switch 43 is turned on to be in automatic shift mode, the vehicle control unit 44 will receive the data of the main power motor 11 or the engine speed and torque load to activate the gear-shifting driving unit 3 to drive the gearshift lever 2 to generate a fully automatic downshifting gear or an upshifting gear and a neutral gear control. It avoids the complicated shifting action of the driver to step on the gearshift lever 2 with his feet to advance or hook the gearshift lever 2 with the instep to reverse, thereby achieving the purpose of changing gears more conveniently, improving driving safety and saving energy when driving.

Please refer to FIGS. 3, 6, 8 and 9, the manual switch 42 and the auto switch 43 provided beside the grip 41 are electrically connected to the vehicle control unit 44, and the gear-shifting driving unit 3 is also electrically connected to the vehicle control unit 44, so that the manual switch 42 and the auto switch 43 can be used to control the gear-shifting driving unit 3 to shift up or down. Wherein the gear-shifting driving unit 3 comprises a motor 31, a speed reducer and a cam 325. The motor 31 is set at the input end of the speed reducer. The casing 32 of the speed reducer is provided with a first reduction gear 321 and a second reduction gear 322. The motor 31 drives the first reduction gear 321. The second reduction gear 322 has a power take-off shaft 324 extending out from one side of the casing 32. A circuit board 34 with a micro-motion sensor 341 is assembled on one side of the casing 32, and the second reduction gear 322 and the circuit board 34 are enclosed in the casing 32 by a side cover 33 and a gasket 331. The cam 325 is provided on the power take-off shaft 324 of the second reduction gear 322. When the motor 31 drives the first reduction gear 321 and the second reduction gear 322 to rotate, it also drives the cam 325 disposed on the second reduction gear 322 power take-off shaft 324 to rotate forward or reverse synchronously. By means of the magnetic element 3231 or the convex part on the second reduction gear 322 hub 323 and the micro-motion sensor 341 to generate sensing or pressure contact, and then after the cam 325 rotates forward or reverse 360 degrees, the motor 31 is stopped to make the cam 325 stop at the original position.

Figure 4:
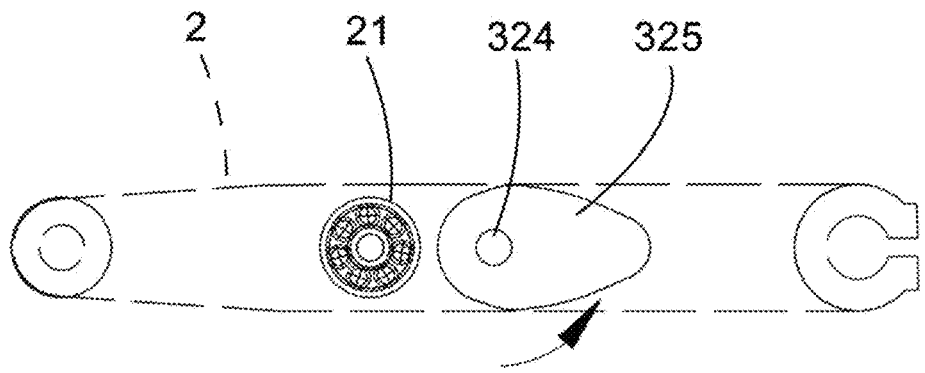
Figures 1, 4:
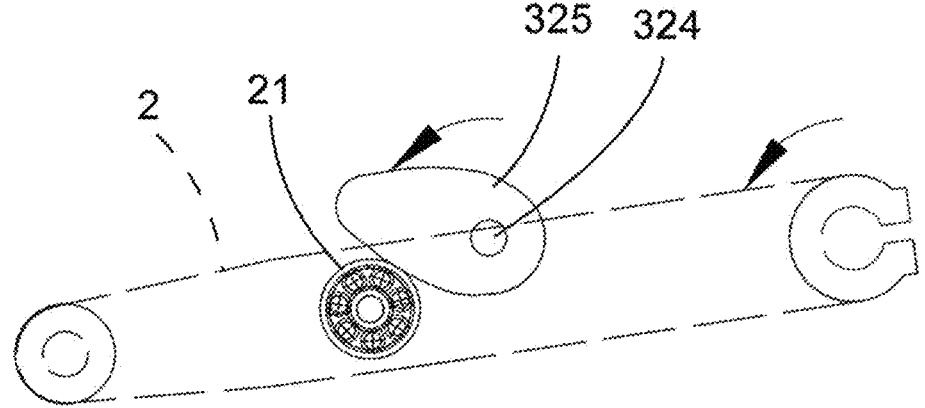
Figures 2, 4:
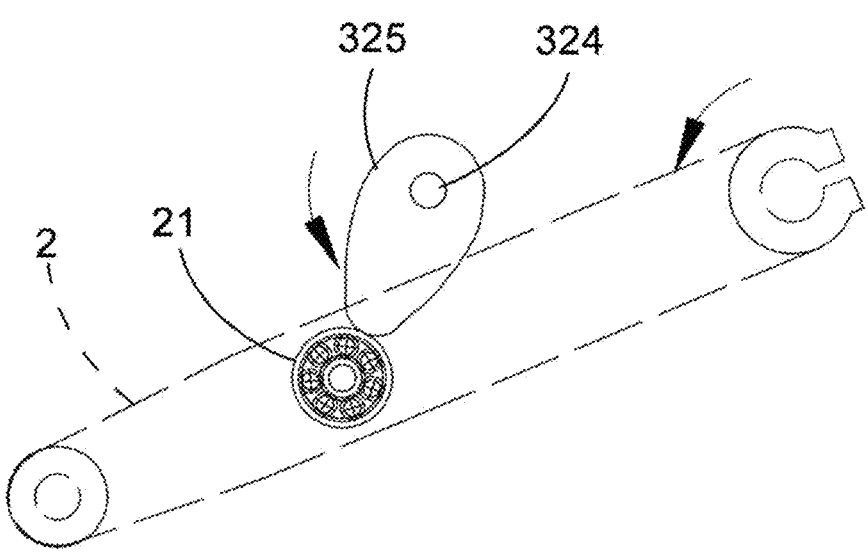
Figures 3, 4:
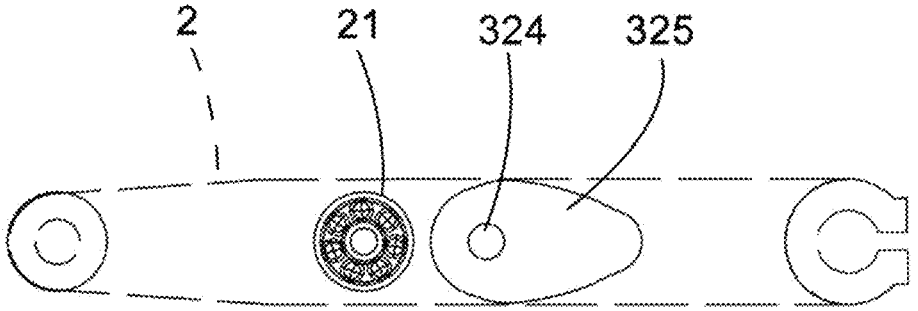
Figure 5:
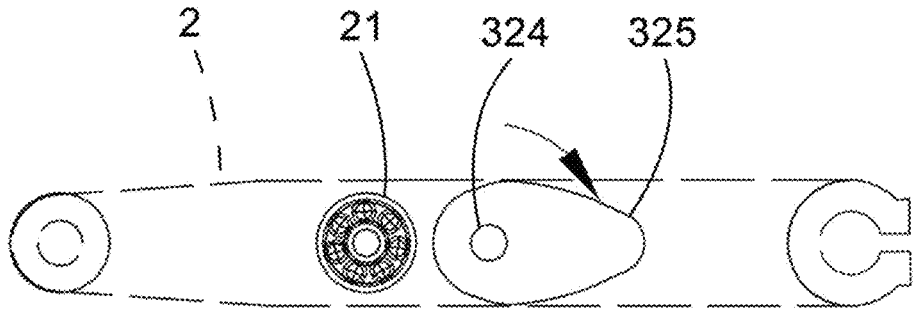
Figures 1, 5:
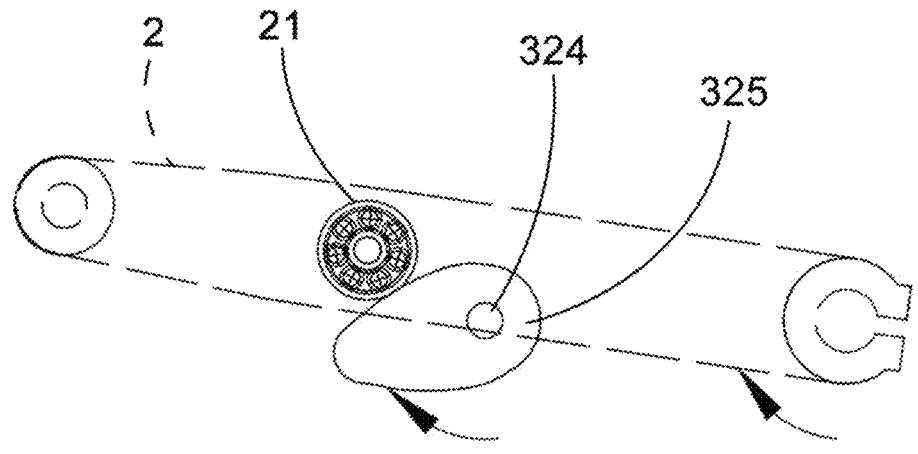
Figures 2, 5:
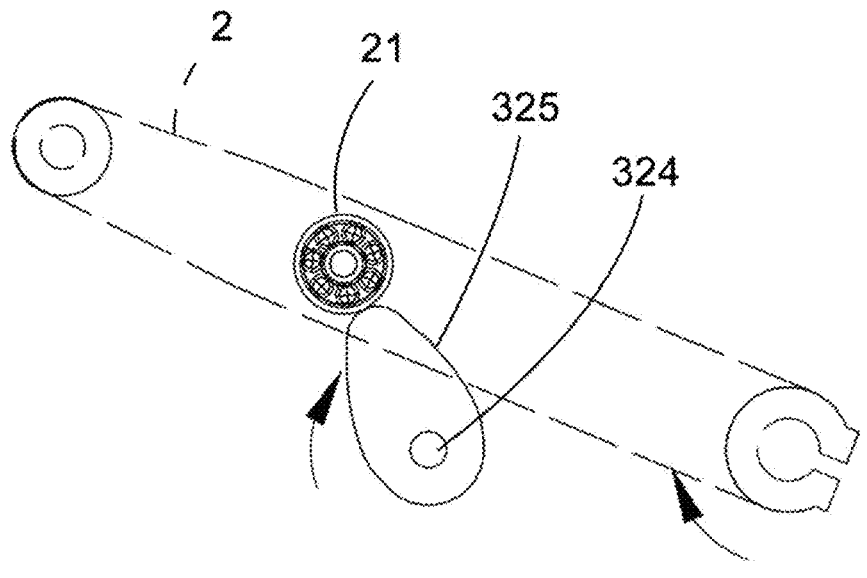
Figures 3, 5:
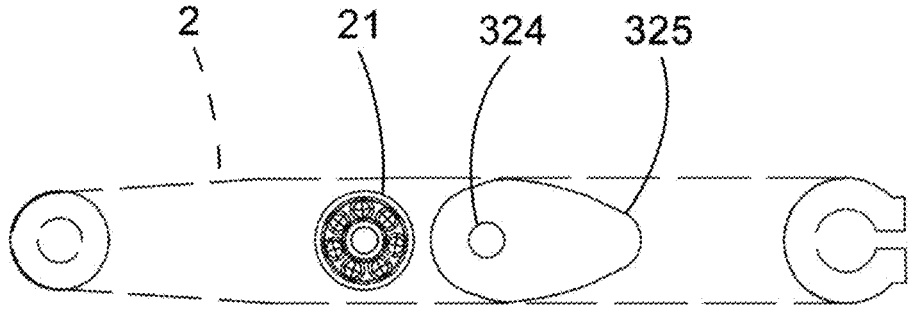

When the manual gear shift is performed, the manual switch 42 located next to the grip 41 is pressed "+" once. at this time, the vehicle control unit 44 receives the "+" signal from the manual switch 42. The vehicle control unit 44 controls the motor 31 of the gear-shifting driving unit 3 to move and drives the cam 325 to reverse 360 degrees once. When the cam 325 rotates, it pushes the roller 21 arranged on the inner side of the gearshift lever 2 to lower the gearshift lever 2, and then complete the action of pressing the gearshift lever 2 to advance the gear once (as shown in FIGS. 4 to 4-3). On the contrary, when the manual switch 42 located beside the grip 41 is pressed "–" once, the vehicle control unit 44 receives the "–" signal of the manual switch 42, the vehicle control unit 44 controls the motor 31 of the gear-shifting driving unit 3 to move and drives the cam 325 to rotate forward 360 degrees once. When the cam 325 rotates, it pushes the roller 21 arranged on the inner side of the gearshift lever 2 to push the gearshift lever 2 upward, and then complete the action of pushing the gearshift lever 2 back once (as shown in FIGS. 5 to 5-3). When the automatic gear shift is performed, the auto switch 43 is pressed to be in the automatic shift mode, the vehicle control unit 44 automatically performs a closed loop control. This loop repeats itself, and the vehicle control unit 44 continuously detects the following input signals: the throttle 45 signal, the current of the main power motor 11 of the motor controller 112, the speed (RPM) of the main power motor 11 of the motor controller 112, the gear position of the transmission box 1 and the micro-motion sensor 341 built into the gear-shifting driving unit 3. There is an electrical connection between the vehicle control unit 44 and the motor controller 112. After the vehicle control unit 44 obtains the signal from the throttle 45, it will set the desired speed value of the main power motor 11 of the motor controller 112 according to the throttle 45 signal of each gear built into the vehicle control unit 44 and the speed (RPM) data of the main power motor 11 of the motor controller 112. The vehicle control unit 44 also controls the current of the main power motor 11 obtained by the motor controller 112 at each gear and the upper and lower limits of the speed (RPM) of the main power motor 11 obtained by the motor controller 112, so that the vehicle control unit 44 controls the gear-shifting driving unit 3 to drive the gearshift lever 2 to produce fully automatic control of pressing down to shift into gear or pushing up to shift out of gear and neutral gear.

When accelerating at the start or while driving, the driver needs to turn the throttle 45 which is located on the other side of the vehicle 4 and is electrically connected to the vehicle control unit 44. The vehicle control unit 44 detects that the opening (rotation) of the throttle 45 is increased, and the motor controller 112 is set to the desired value of the speed (RPM) of the main power motor 11 according to the throttle 45 signal of each gear built into the vehicle control unit 44 and the speed (RPM) data of the main power motor 11 of the motor controller 112. This setting will increase the current of the main power motor 11 and increase the speed of the main power motor 11, and drive the transmission box 1 to increase the speed of the speed output shaft 13. At this time, the vehicle speed increases and enters the acceleration state.

The vehicle control unit 44 is provided with values of "the upper limit of the current of the main power motor 11 of the motor controller 112 in each gear and the upper and lower limits) of the speed (RPM) of the main power motor 11 of the motor controller 112". The vehicle control unit 44 actively intervenes to control the gear-shifting driving unit 3 to drive the gearshift lever 2 according to the aforementioned internal setting value to generate fully automatic control of pressing down to shift into gear or pushing up to shift out of gear and neutral gear. If the vehicle control unit 44 detects that the speed of the main power motor 11 has exceeded the upper limit of the gear, the vehicle control unit 44 will control the motor 31 of the gear-shifting driving unit 3 to drive the cam 325 to rotate 360 degrees in the reverse direction once and trigger the micro-motion sensor 341 to stop. When the cam 325 rotates, the roller 21 located on the inner side of the gearshift lever 2 is pushed down to press the gearshift lever 2, thereby completing the action of pressing down the gearshift lever 2 to shift gears once (as shown in FIGS. 4 to 4-3). Similarly, after the gear is shifted, when the vehicle control unit 44 detects that the speed of the main power motor 11 exceeds the speed value set for this gear, it controls the motor 31 of the gear-shifting driving unit 3 to drive the cam 325 to rotate 360 degrees in the reverse direction and triggers the micro-motion sensor 341 to stop. When the cam 325 rotates, the roller 21 disposed on the inner side of the gearshift lever 2 is pushed to press gearshift lever 2, thereby completing the action of pressing down the gearshift lever 2 to shift gears once more, until the highest speed gear is shifted.

In addition, the vehicle control unit 44 also actively intervenes to control the gear-shifting driving unit 3 to drive the gearshift lever 2 to generate full automatic control of pressing down to shift into gear or pushing up to shift out of gear and neutral gear according to the upper and lower limits of the current of the main power motor 11 of the motor controller 112 for each gear and the upper and lower limits of the speed (RPM) of the main power motor 11 of the motor controller 112.

When the vehicle control unit 44 detects that the opening (rotation) of the throttle 45 remains unchanged, it means that the driving is expected to be [constant speed]; or when the vehicle control unit 44 detects that the opening (rotation) of the throttle 45 is increasing, it means that the driver intends to [accelerate]. In the above two driving behaviors, if the current value of the main power motor 11 does not exceed the upper limit of the gear, it means that the load is normal; on the contrary, if the current value of the main power motor 11 exceeds the upper limit of the gear, it means that the load is too high. If the speed (RPM) of the main power motor 11 does not increase or is lower than the desired value set by the vehicle control unit 44, the vehicle control unit 44 will control the motor 31 of the gear-shifting driving unit 3 to drive the cam 325 to rotate 360 degrees forward once and trigger the micro-motion sensor 341 to stop. When the cam 325 rotates, the roller 21 located on the inner side of the gearshift lever 2 is pushed up to push the gearshift lever 2, thereby completing the action of pushing up the gearshift lever 2 to shift down (as shown in FIGS. 5 to 5-3), so as to generate higher torque, avoid insufficient vehicle torque and the main power motor 11 being operated in a poor efficiency section.

Figure 10:
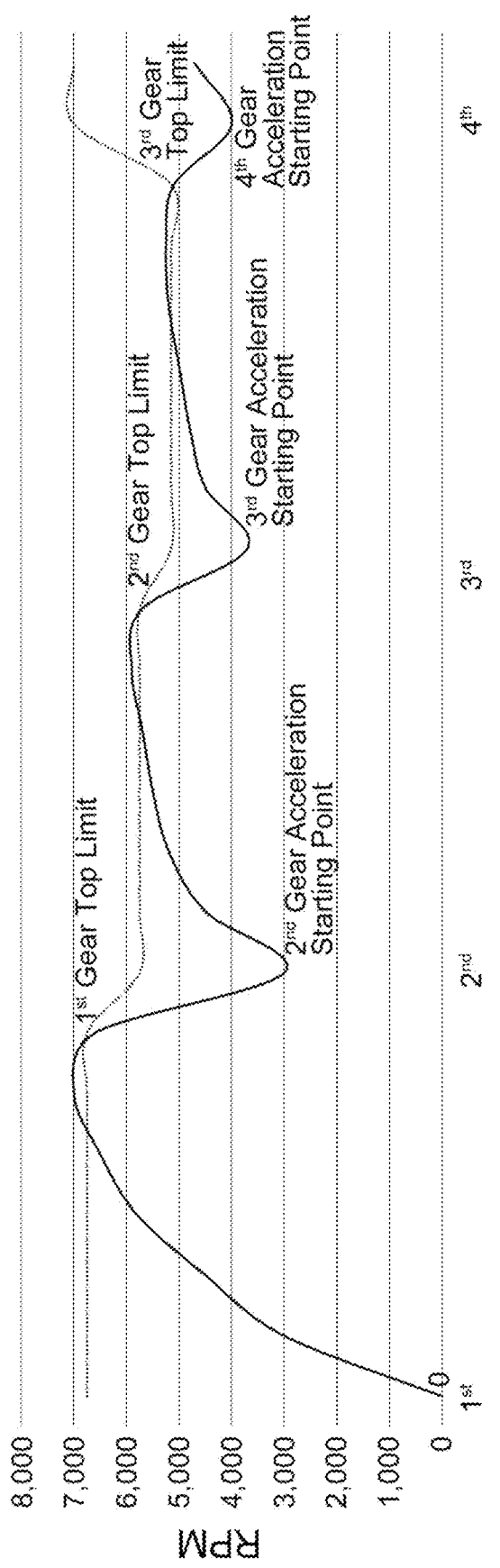
FIG. 10 shows a timing curve of the vehicle control unit (VCU) of the present invention for automatically shifting gears according to the main power motor speed when the vehicle accelerates.

Please refer to FIG. 10, which is a timing curve diagram of the vehicle control unit 44 (VCU) of the present invention for automatically shifting gears according to the main power motor speed (RPM) when the vehicle accelerate, where the solid line represents the RPM of the main power motor 11 of the motor controller 112, and the dotted line above represents the upper limit of the RPM of the main power motor 11 of the motor controller 112 in each gear. This case is explained using a 4-speed transmission box 1 as an example, but the number of gears of the transmission box 1 is not limited thereto.

When the auto switch 43 is pressed to enter the automatic shift mode, the vehicle control unit 44 automatically performs a closed loop control, which repeats itself and continuously detects the signals, including the signal of the throttle 45, the current of the main power motor 11 of the motor controller 112, the speed (RPM) of the main power motor 11 of the motor controller 112, the gear position of the transmission box 1 and the micro-motion sensor 341 built into the gear-shifting driving unit 3. The vehicle control unit 44 is electrically connected to the motor controller 112. After the vehicle control unit 44 obtains the throttle 45 signal, it will set the desired value of the main power motor 11 speed (RPM) for the motor controller 112 according to the built-in "throttle 45 signal of each gear and the motor RPM value of the motor controller 112", and the vehicle control unit 44 will also actively intervene to control the gear-shifting driving unit 3 to drive the gearshift lever 2 to generate full automatic control of pressing down to shift into gear or pushing up to shift out of gear and neutral gear according to the "upper limit of the current of the main power motor 11 of the motor controller 112 in each gear and the upper and lower limit values of the speed (RPM) of the main power motor 11 of the motor controller 112".

The actual operation is as follows:

When the vehicle 4 is accelerating in the first gear, when the RPM of the main power motor 11 exceeds the upper limit of the first gear, the vehicle control unit 44 actively intervenes to control the gear-shifting driving unit 3 to shift to the second gear. At this time, the speed (RPM) of the main power motor 11 of the motor controller 112 drops to the $2^{nd}$ gear acceleration starting point. When the RPM of the main power motor 11 exceeds the upper limit of the $2^{nd}$ gear in the 2nd gear, the vehicle control unit 44 actively intervenes to control the gear-shifting driving unit 3 to shift to the $3^{rd}$ gear. At this time, the speed (RPM) of the main power motor 11 of the motor controller 112 drops to the $3^{rd}$ gear acceleration starting point. When the RPM of the main power motor 11 exceeds the upper limit of the $3^{rd}$ gear in the $3^{rd}$ gear, the vehicle control unit 44 actively intervenes to control the gear-shifting driving unit 3 to shift to the $4^{th}$ gear. At this time, the speed (RPM) of the main power motor 11 of the motor controller 112 drops to the $4^{th}$ gear acceleration starting point. Since $4^{th}$ gear is the last gear, the upper speed limit is the upper limit of the electric drive capacity. Regardless of the number of gears, the upshift control logic is exactly the same.

Figure 11:
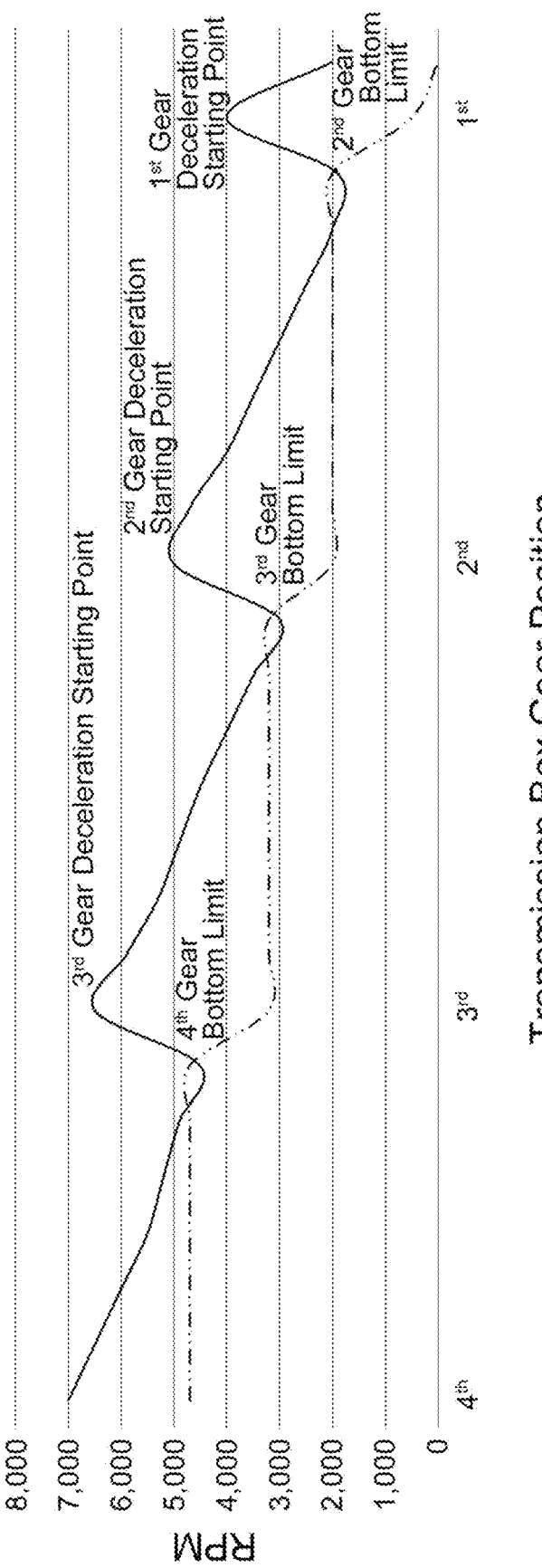
FIG. 11 is a timing curve diagram of the vehicle control unit (VCU) of the present invention performing automatic gear shifting according to the main power motor speed when the vehicle decelerates.

When the vehicle 4 decelerates in the last $4^{th}$ gear and the speed (RPM) of the main power motor 11 exceeds the $4^{th}$ gear lower limit, the vehicle control unit 44 actively intervenes to control the gear-shifting driving unit 3 to shift down to the $3^{rd}$ gear. At this time, the speed (RPM) of the main power motor 11 of the motor controller 112 increases to the $3^{rd}$ deceleration starting point. When the speed (RPM) of the main power motor 11 exceeds the lower limit of the $3^{rd}$ gear during deceleration in the $3^{rd}$ gear, the vehicle control unit 44 actively intervenes to control the gear-shifting driving unit 3 to shift down to the $2^{nd}$ gear. At this time, the speed (RPM) of the main power motor 11 of the motor controller 112 increases to the $2^{nd}$ deceleration starting point. When the speed (RPM) of the main power motor 11 exceeds the lower limit of the $2^{nd}$ gear during deceleration in the $2^{nd}$ gear, the vehicle control unit 44 actively intervenes to control the gear-shifting driving unit 3 to shift down to the $1^{st}$ gear. At this time, the RPM of the main power motor 11 of the motor controller 112 increases to the $1^{st}$ gear deceleration starting point (as shown in FIG. 11). Since $1^{st}$ gear is the first gear, the lower speed limit is 0. Regardless of the number of gears, the downshift control logic is exactly the same.

Figure 12:
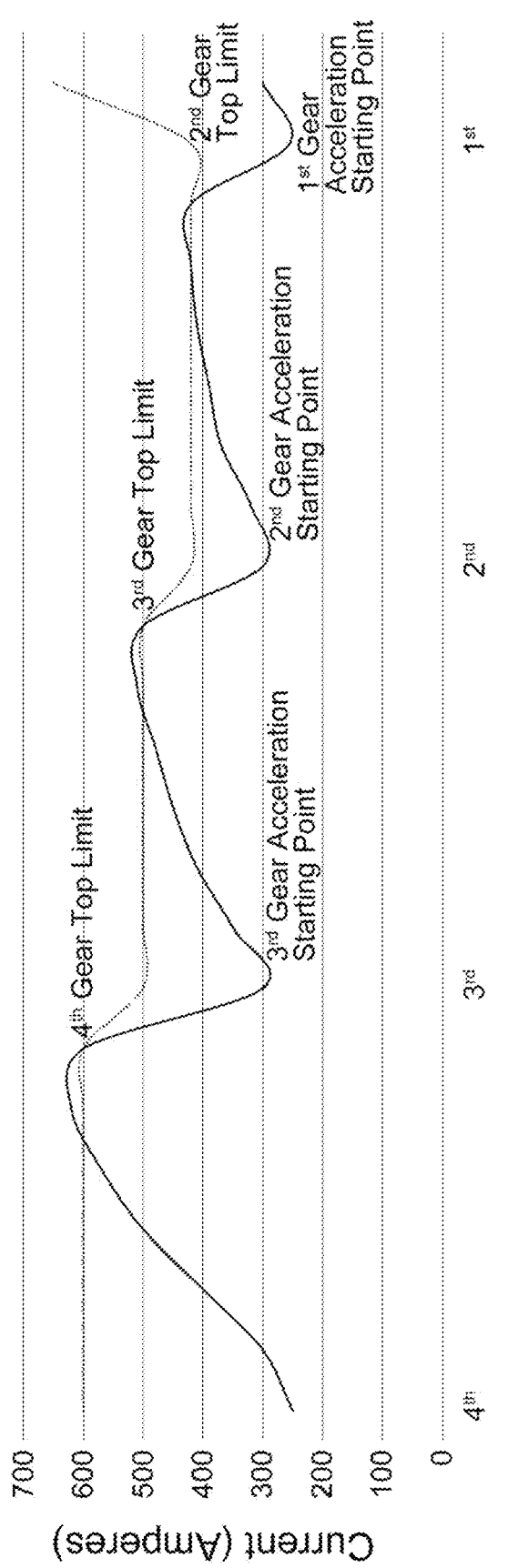
FIG. 12 shows a timing curve of automatic gear shifting using the active power motor current value of the vehicle control unit (VCU) of the present invention.
Figure 13:
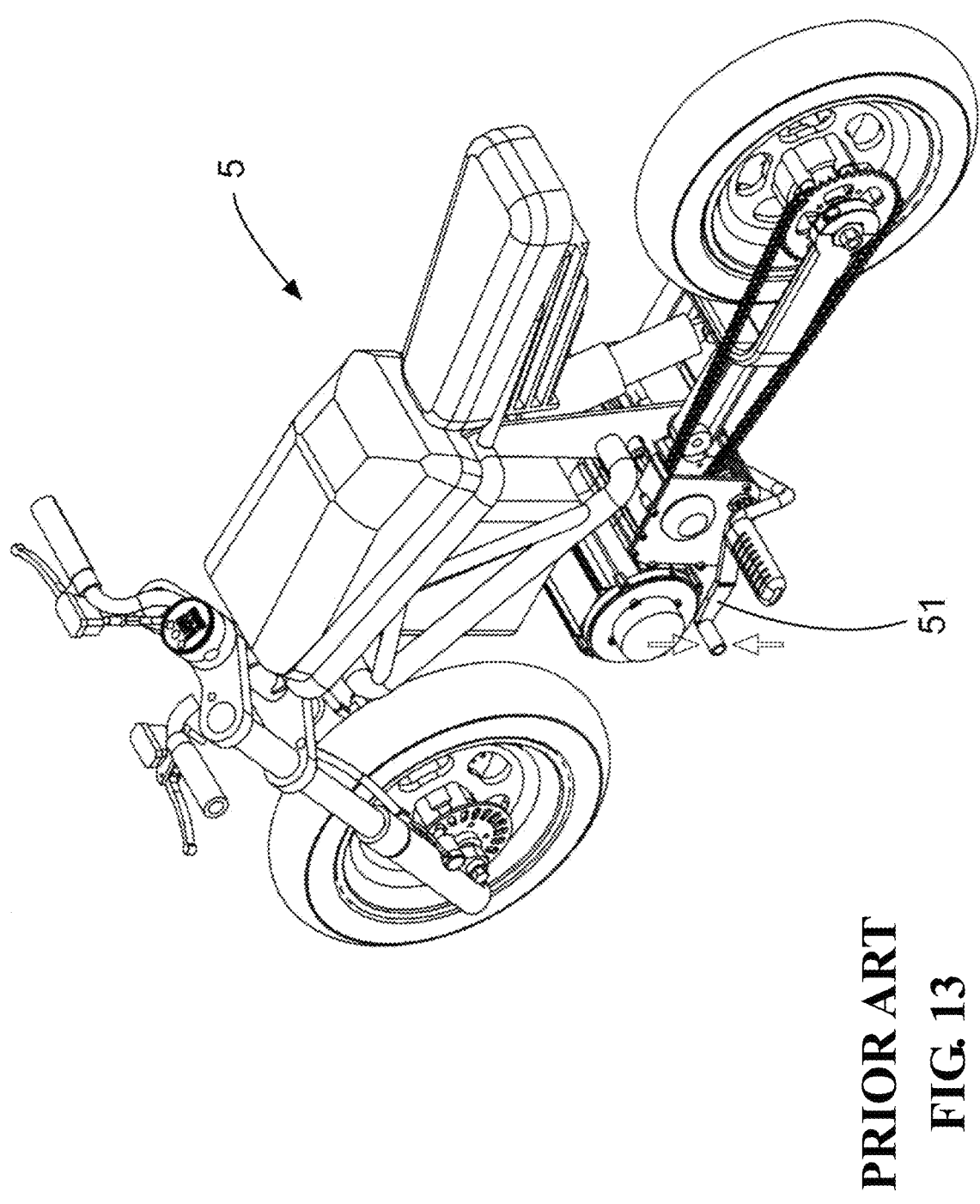
FIG. 13 is a perspective view of a conventional vehicle.

Please refer to FIG. 12, which is a timing curve of the vehicle control unit 44 (VCU) of the present invention for automatic gear shifting with the main power motor current value, where the solid line represents the current value of the main power motor 11 of the motor controller 112, and the dotted line above represents the upper limit of the current value of the motor controller 112 in each gear.

When the vehicle control unit 44 detects that the opening degree (rotation) throttle 45 unchanged, it means that the driving desire is [constant speed]; or when the vehicle control unit 44 detects that the opening degree (rotation) throttle 45 increases, it means that the driver wants to [accelerate]. In the above two driving behaviors, if the current value of the main power motor 11 does not exceed the upper limit of the gear, it means that the load is normal; on the contrary, if the current value of the main power motor 11 exceeds the upper limit of the gear, it means that the load is too high. If the speed (RPM) of the main power motor 11 does not increase or is lower than the desired value set by the vehicle control unit 44, the vehicle control unit 44 will control the motor 31 of the gear-shifting driving unit 3 to drive the cam 325 to rotate 360 degrees forward once and trigger the micro-motion sensor 341 to stop. When the cam 325 rotates, the roller 21 located on the inner side of the gearshift lever 2 is pushed up to push the gearshift lever 2, thereby completing the action of pushing up the gearshift lever 2 to shift down (as shown in FIGS. 5 to 5-3), so as to generate higher torque, avoid insufficient vehicle torque and the main power motor 11 being operated in a poor efficiency section.

When the gear is in the last $4^{th}$ gear and the main power motor 11 current obtained by the motor controller 112 exceeds the upper limit of the $4^{th}$ gear, the vehicle control unit 44 actively intervenes to control the gear-shifting driving unit 3 to shift down to the $3^{rd}$ gear. At this time, the current of the main power motor 11 of the motor controller 112 drops to the $3^{rd}$ gear acceleration starting point. When the current of the main power motor 11 of the motor controller 112 exceeds the upper limit of the $3^{rd}$ gear, the vehicle control unit 44 actively intervenes to control the gear-shifting driving unit 3 to shift down to the $2^{nd}$ gear. At this time, the current of the main power motor 11 of the motor controller 112 drops to the $2^{nd}$ gear acceleration starting point. When the current of the main power motor 11 of the motor controller 112 in the $2^{nd}$ gear exceeds the upper limit of the $2^{nd}$ gear, the vehicle control unit 44 actively intervenes to control the gear-shifting driving unit 3 to shift down to the $1^{st}$ gear. At this time, the motor current of the motor controller 112 drops to the $1^{st}$ gear acceleration starting point. Since $1^{st}$ gear is the first gear, the current limit is the upper limit of the electric drive capacity. Regardless of the number of gears, the downshift control logic is exactly the same.

The gear-shifting driving unit 3 is locked to the transmission box side cover 12 for easy maintenance or replacement of the gear-shifting driving unit 3.

The micro-motion sensor 341 can be a sensing chip or a micro switch.

To sum up, the present invention has the effect of improving the safety of driving without the need to step on or hook back the gearshift lever for shifting the gears. Thus, the effect of driving safety is improved.

What the invention claimed is:

1. A vehicle shifting mechanism, comprising:
a vehicle control unit for controlling movement of a vehicle;
a transmission box;
a gearshift lever; and
a gear-shifting driving unit;
wherein gearing elements associated with a speed output shaft of said transmission box are driven by a main power motor, said main power motor being controllably driven by a motor controller, electrically connected to said vehicle control unit for controlling a speed and a current load of said main power motor, said gearshift lever being pivotably coupled to a gearshift shaft of said transmission box, said gear-shifting driving unit being arranged on a lateral side of said gearshift lever, a manual switch and an auto switch being positioned adjacent to a gripping member of the vehicle and being electrically connected to said vehicle control unit, and a throttle located on a side of the vehicle opposing said gripping member and being configured to generate a throttle signal, said throttle and said gear-shifting driving unit being electrically connected to the vehicle control unit, said vehicle control unit being configured to include built-in values for a throttle for each of a corresponding gear of the gearing elements associated with the speed output shaft, an upper limit of an active motor current of said motor controller, and upper and lower limits of the speed of the main power motor, said vehicle control unit responsively and selectively changing a corresponding one of gears associated with the gearing elements associated with the speed output shaft based on a value of the current and a value of the speed of said main power motor through the electrical connection between said manual switch, said vehicle control unit, and said gear-shifting driving unit, wherein said vehicle control unit receives a signal from said manual switch to either of shift into or out of gear, and said gear-shifting driving unit is responsively selectively actuated by said vehicle control unit to correspondingly drive said gearshift lever to either of push down on the gear or push up on the gear;
wherein when said auto switch is turned on to be in automatic shift mode, said vehicle control unit receives data of torque load associated with said main power motor or the value of the speed and the value of the current generated by said motor controller, and said vehicle control unit responsively and selectively controls said gear-shifting driving unit to correspondingly drive said gearshift lever to generate fully automatic gear shift control whereby said gearshift lever is selectively pressed down to shift in or selectively pushed up to shift out and remain neutral at an optimal time point associated with respective values of the speed and current of the main power motor and received by said vehicle control unit;

said gear-shifting driving unit including a motor, a speed reducer, and a cam, said motor being positioned at an input end of said speed reducer, said speed reducer including a casing, a first reduction gear, and a second reduction gear, and the first and second reduction gears being positioned in said casing, said motor of said gear-shifting driving unit being configured to drive said first and second reduction gears, and said second reduction gear including a power take-off shaft extending out from said casing, and a circuit board having a micro-motion sensor being assembled on a side of said casing, and said second reduction gear and said circuit board being enclosed within said casing by a side cover and a gasket, said cam being drivingly coupled to said power take-off shaft of said second reduction gear, wherein when said motor of said gear-shifting driving unit drives said first reduction gear and said second reduction gear to rotate, said cam is responsively driven to rotate in either of forward or reverse directions to thereby drive said gearshift lever to, respectively, press down on a forward gear or push up on a reverse gear, thereby responsive to positioning of a magnetic element on a hub section of said second reduction gear and said micro-motion sensor generating a corresponding sensing or pressure contact and subsequent to said cam completing rotating forward or reverse, said motor of said gear-shifting driving unit is responsively shut to position said cam at an original position.

2. The vehicle shifting mechanism as claimed in claim 1, wherein said gear-shifting driving unit is mounted to a side cover of said transmission box.

3. The vehicle shifting mechanism as claimed in claim 1, wherein said micro-motion sensor is either one of a sensing chip or a micro switch.

4. The vehicle shifting mechanism as claimed in claim 1, wherein when said manual switch is pressed "+" once, said vehicle control unit receives the "+" signal from said manual switch, and said vehicle control unit controls the motor of said gear-shifting driving unit to drive said cam to reverse 360 degrees once, and when said cam rotates, said cam pushes a roller located on an inner side of said gearshift lever down to press said gearshift lever, thereby completing pressing said gearshift lever down to selectively shift a corresponding one of gears associated with the gearing elements associated with the speed output shaft once; and when said manual switch is pressed "–" once, said vehicle control unit receives the "–" signal from said manual switch, and said vehicle control unit controls the motor of said gear-shifting driving unit to move and drive said cam to rotate forward 360 degrees once, and when said cam rotates forward, said cam pushes said roller located on the inner side of said gearshift lever to push said gearshift lever, thereby completing pushing said gearshift lever up to shift down once.

5. The vehicle shifting mechanism as claimed in claim 1, wherein when the automatic shift mode is activated by pressing said auto switch, said vehicle control unit responsively performs a repeating closed loop control, and subsequently said vehicle control unit continuously detects: the throttle signal, driving by the motor controller of the current load associated with the main power motor, driving by the motor controller of the speed associated with the main power motor, gear positions of gearing elements associated with the speed output shaft of said transmission box, and signals associated with said vehicle control unit, and subsequent to said vehicle control unit obtaining the throttle signal, said vehicle control unit sets a desired value with respect to the speed of said main power motor controlled by said motor controller according to throttle signals associated with said gearing elements and speed (RPM) data of said main power motor controlled by said motor controller, and said vehicle control unit also controls the current load associated with said main power motor controlled by said motor controller at each gear associated with said gearing elements and the upper and lower limits associated with the speed of said main power motor controlled by the motor controller, thereby said vehicle control unit selectively controls said gear-shifting driving unit to selectively drive said gearshift lever to generate fully automatic control of pressing down to shift into gear or pushing up to shift out of gear.

* * * * *